Figure 6:
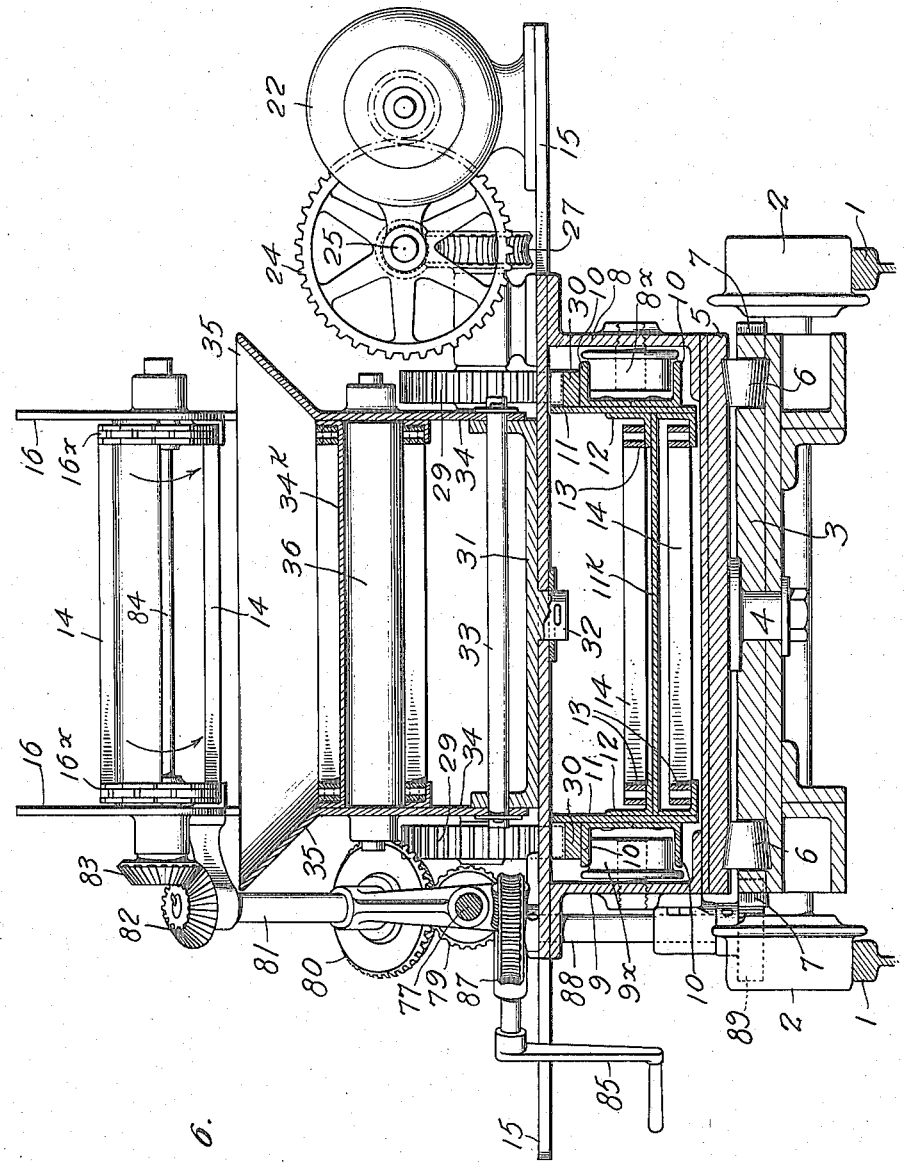

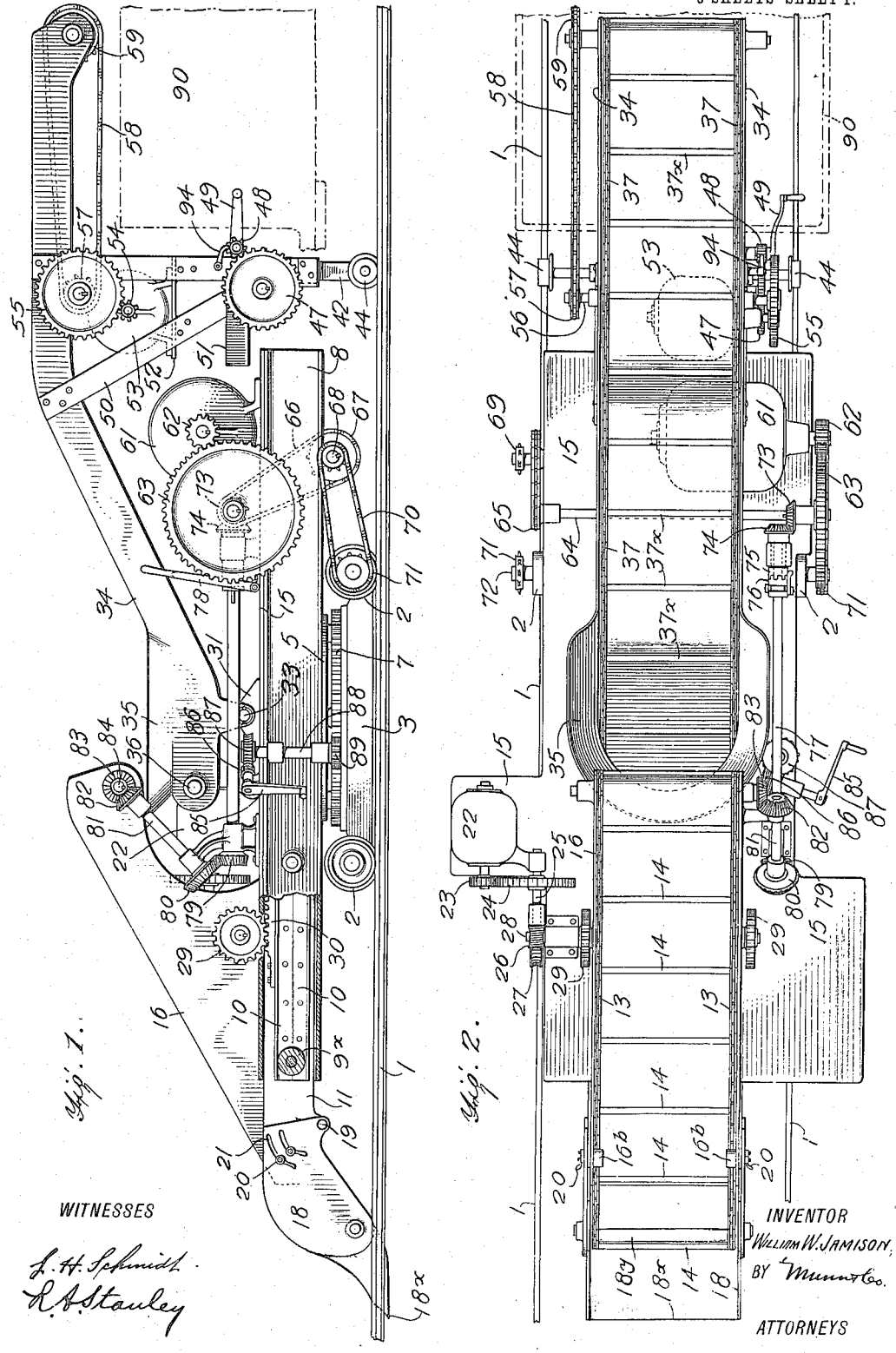

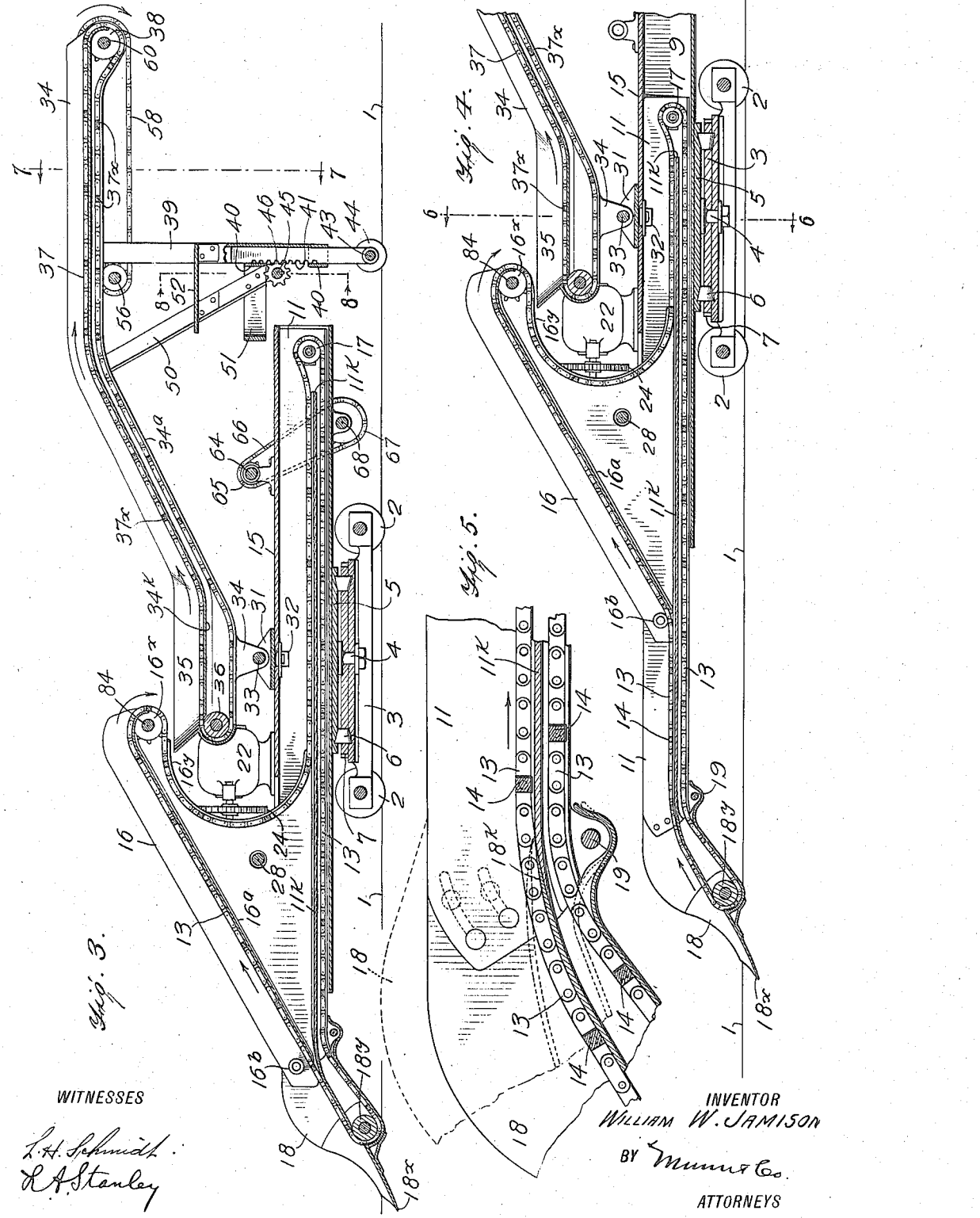

W. W. JAMISON.
COAL LOADING DEVICE.
APPLICATION FILED JULY 2, 1913.

1,128,880.

Patented Feb. 16, 1915.
5 SHEETS—SHEET 3.

WITNESSES

INVENTOR
WILLIAM W. JAMISON,
BY
ATTORNEYS

W. W. JAMISON.
COAL LOADING DEVICE.
APPLICATION FILED JULY 2, 1913.
1,128,880.
Patented Feb. 16, 1915.
5 SHEETS—SHEET 4.
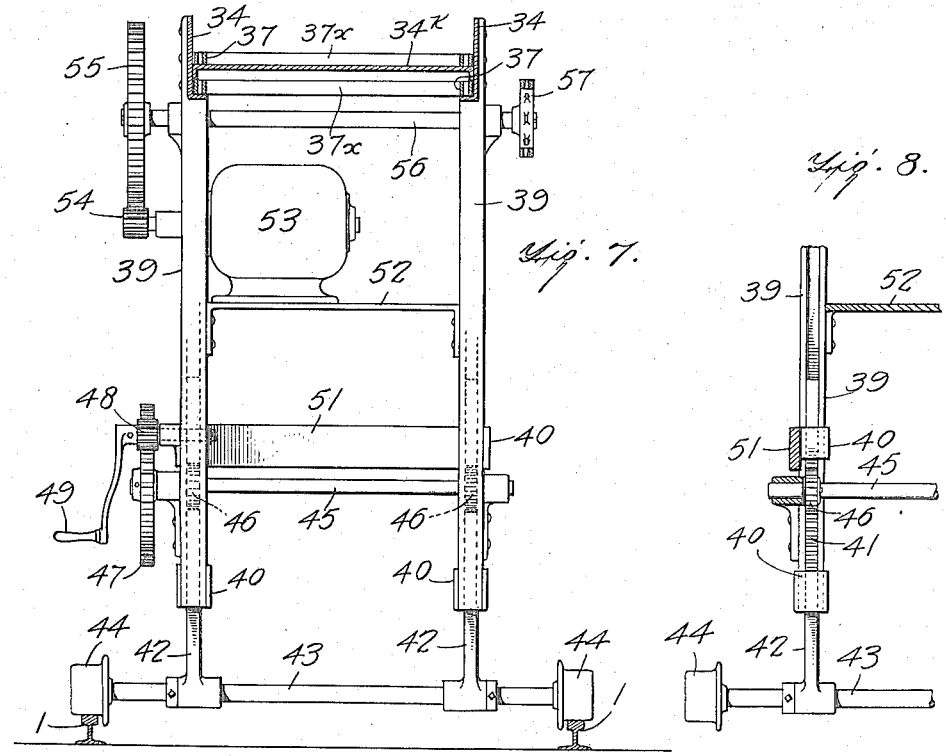
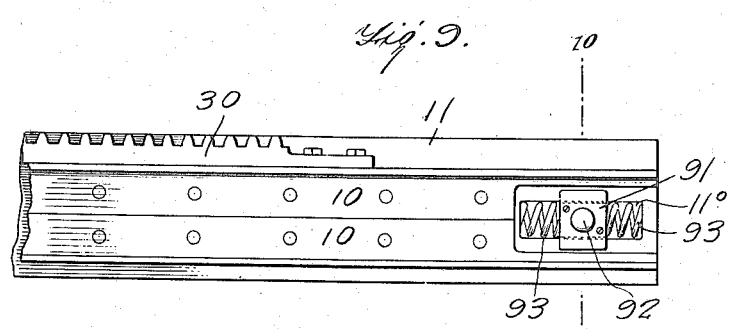
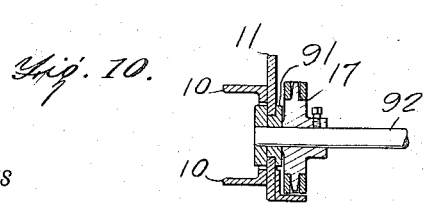
WITNESSES
INVENTOR
WILLIAM W. JAMISON,
BY
ATTORNEYS

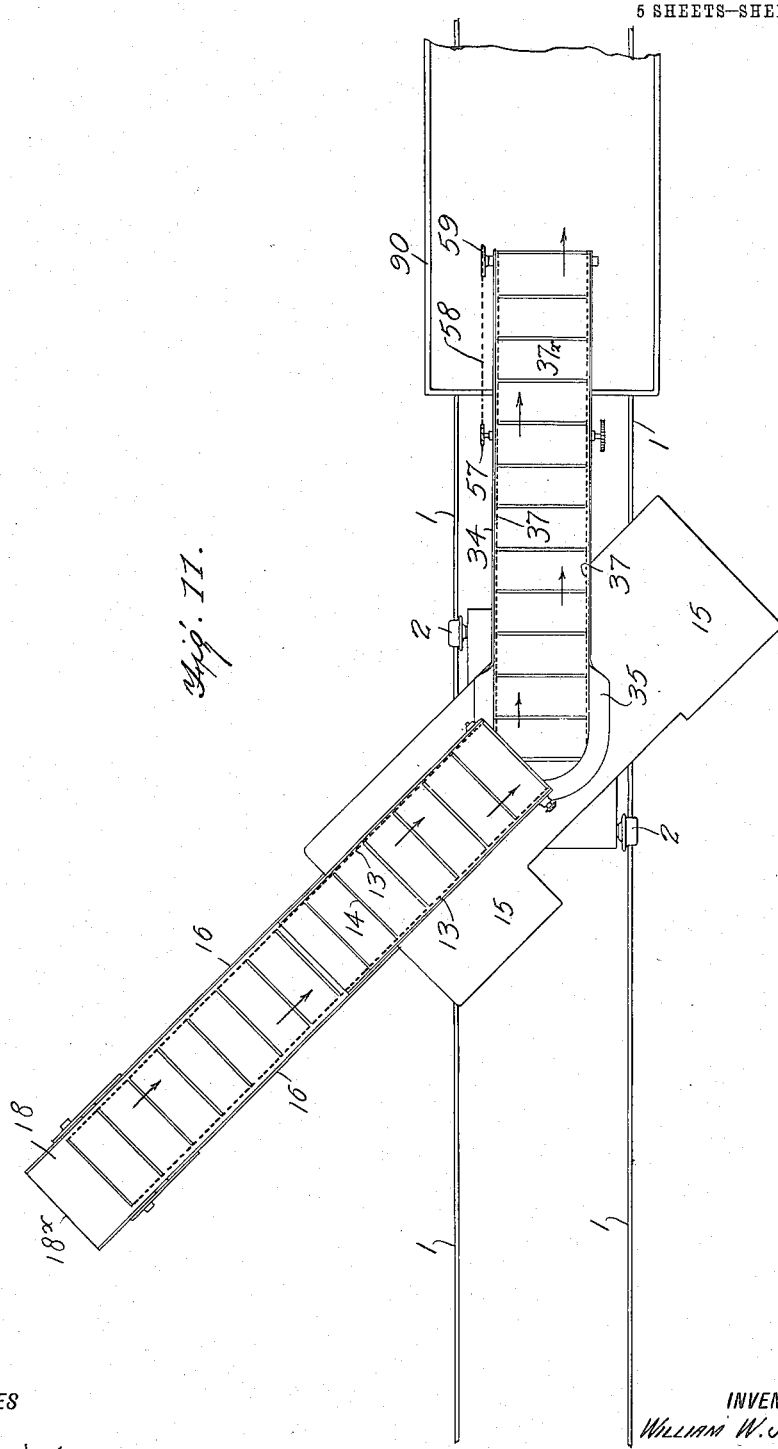

UNITED STATES PATENT OFFICE.

WILLIAM WIBLE JAMISON, OF GREENSBURG, PENNSYLVANIA.

COAL-LOADING DEVICE.

1,128,880.   Specification of Letters Patent.   Patented Feb. 16, 1915.

Application filed July 2, 1913. Serial No. 776,930.

*To all whom it may concern:*

Be it known that I, WILLIAM W. JAMISON, a citizen of the United States, and a resident of Greensburg, in the county of Westmoreland and State of Pennsylvania, have made certain new and useful Improvements in Coal-Loading Devices, of which the following is a specification.

My invention relates to devices designed to load loose or broken down coal into mine cars, and it consists in the combinations, constructions, and arrangements herein described and claimed.

An object of my invention is to provide a device having a movable chute which may be thrust forward into the loose coal, and means for elevating the latter into the car.

A further object of my invention is to provide means for permitting the swinging of the chute to one side or the other without interfering with its forward and backward movement, thereby increasing the range of operation of the chute.

A further object of my invention is to provide a chute which may be mounted on a truck with an auxiliary conveyer pivotally secured to the truck so as to permit the turning of the chute around the pivotal point as a center independently of the auxiliary conveyer, while at the same time the chute is in position to deliver coal to the auxiliary conveyer.

A further object of my invention is to provide means for supporting the auxiliary conveyer on the truck when it is desired to shift the apparatus as a whole.

Other objects and advantages will appear in the following specification and the novel features of the device will be particularly pointed out in the appended claims.

My invention is illustrated in the accompanying drawings forming part of this application in which—

Figure 1 is a side view of the device, Fig. 2 is a plan view thereof, Fig. 3 is a longitudinal section through the device, Fig. 4 is a view similar to Fig. 3, showing the chute in its extended position, Fig. 5 is a detail view showing the means of adjusting the shovel of the chute, Fig. 6 is a section along the line 6—6 of Fig. 4, Fig. 7 is a section along the line 7—7 of Fig. 3, Fig. 8 is a section along the line 8—8 of Fig. 3, Fig. 9 is a detail view showing a movable bearing for one of the endless chains, Fig. 10 is a section along the line 10—10 of Fig. 9, and Fig. 11 is a diagrammatic plan view showing the relative positions of the conveyers.

In carrying out my invention I mount upon the track rails 1 the wheels 2 of a truck frame 3. The latter bears the pivot pin 4 of a turn table 5, rollers 6 being provided for reducing friction. Carried by the truck frame 3 is a circular rack 7.

Mounted on the turn table 5 are longitudinal side members 8 and 9 (see Fig. 6) which bear flanged wheels or rollers $8^x$ and $9^x$ respectively arranged to receive the upper and lower side flanges 10 carried by the sides of the movable chute 11. The latter in turn is provided with upper and lower inwardly projecting flanges 12 arranged to receive the endless chains such as that shown at 13 in Figs. 2 to 5 inclusive which are provided with cross strips 14, the latter constituting scraping members, as will be explained later.

Disposed above and carried by the upper part of the longitudinal side members 8 and 9 is a base or table 15 at the forward end of which are disposed the side walls 16 of an elevator or conveyer which is provided with sprocket wheels $16^x$ at its upper end arranged to receive the chain 13 and having a semicircular guide member $16^y$ (see Figs. 3 and 4) around which the chain passes. The chain continues to the rear of the chute 11 being supported by a partition $11^k$ thence around the sprocket 17, and thence forwardly as shown in the drawings.

At the front end of the chute 11 is a shovel. This comprises the side members 18 which are pivoted at 19 upon the side members of the chute 11 and which are adjustable with respect to the side members by means of adjusting nuts 20 upon bolts which are arranged to pass through slots 21 in the members 18 which are concentric with the pivot 19, thus permitting the raising or lowering of the shovel. The latter has a sharp nose or point $18^x$, and is provided with a roller $18^y$ around which the chain 13 extends. This chain, as will be seen from Figs. 3 and 4, passes up the trough formed by the side walls 16 and the bottom $16^a$, being supported upon the latter. A roller $16^b$ is carried between the side members 16 near the lower end thereof.

Referring now to Fig. 2 it will be seen that I have provided a motor 22 upon whose shaft is a gear 23 arranged to mesh with the gear 24 on a shaft 25. The latter bears a worm 26 arranged to engage a gear 27 on a shaft 28 which bears gears 29 on each side of the chute 11. The gears 29 are designed to engage racks 30 carried by the sides of the chute 11 above the flanges 10. It will be apparent therefore that when the motor 22 is energized the latter gives the forward or backward movement of the chute 11 according to the direction in which the motor 22 revolves. Referring again to Fig. 6 it will be seen that a yoke 31 is pivotally connected by a pivot pin or shaft 32 with the table or support 15, while pivotally connected to the yoke 31 by a pivot rod 33 running transversely of the device is a frame 34 which bears a hopper 35. The latter is provided with a roller 36 around which an endless chain 37 passes. The frame 34 extends upwardly and rearwardly, as shown in Figs. 1, 3 and 4. It is provided with a partition $34^k$ upon which the chain is partly supported. At the end of the frame 34 are sprocket wheels 38 around which the chain passes, thence forwardly over the bottom $34^a$ of the frame 34 and thence around the roller 36.

The frame 34 is provided with uprights 39, which are U-shaped in cross section, and which are provided with guide members 40 arranged to receive and retain a movable rack 41 carried by an extension 42. The extension 42 (see Fig. 7) is secured to the axle 43 which bears wheels 44 arranged to run on the track rails 1. Disposed transversely of the supports 39 is a shaft 45 which bears gears 46 arranged to mesh with the racks 41. On the end of the shaft 45 is a gear 47 arranged to mesh with the gear 48 carried by one of the frame members and having an operating handle 49. Braces 50 are provided for the supports 39. Secured to the supports 39 and extending forwardly therefrom is a bracket 51 which is disposed above the table 15 near the wheels 44 on the track 1, but which may be brought down upon the table 15 so as to support the frame 34 as will be explained later.

Between the supporting members 39 is a shelf 52 which supports a motor 53. The latter drives a gear 54 which in turn meshes with the gear 55 on a shaft 56 carried underneath the frame 34 and bearing a sprocket wheel 57 arranged to be engaged by a sprocket chain 58. The latter runs over a sprocket 59 (see Fig. 2) on the shaft 60 which bears the sprocket wheels 38 that drive the chains 37.

Referring now to Figs. 1 and 2 it will be seen that I have provided a motor 61 which, through the medium of a gear 62, drives a gear 63 on a shaft 64. The latter is provided with a sprocket wheel 65 having a sprocket chain 66 passing over a sprocket 67 and a shaft 68. The latter bears a sprocket 69 which, through the medium of a sprocket chain 70, drives a sprocket 71 on the axle 72 which bears the rear wheels 2 of the truck 3. The shaft 64 also bears a gear 73 arranged to mesh with the gear 74 connected with the clutch member 75 arranged to be engaged by a companion clutch member 76 on a shaft 77, the clutch member 76 being brought into engagement with the clutch member 75 by means of a lever 78. The shaft 77 bears a gear 79 arranged to mesh with the gear 80 on a short shaft 81 which in turn bears a gear 82 arranged to mesh with a gear 83 on a shaft 84 which bears the sprocket wheels $16^x$ over which the chain 13 runs.

Mounted on the table 15 is a crank 85 having a worm 86 arranged to engage a worm gear 87 on a shaft 88 which bears at its lower end a gear 89 arranged to mesh with the rack 7.

From the foregoing description of the various parts of the device the operation thereof may be readily understood.

Consider the position of the device as shown in Figs. 1, 2 and 3. In this position the chute 11 is retracted and the nose or the point $18^x$ of the shovel 18 is lowered in position preparatory to forcing it into the coal. This is done as heretofore explained by energizing the motor 22 which will cause the movement of the gears 29 so as to engage the racks 30 thus causing the forward movement of the chute 11 and thrusting the point of the shovel underneath the coal which is forced upon the traveling scraper composed of the chains 13 and the cross members 14, thus carrying coal upwardly and rearwardly and depositing it in the hopper 35 where the endless belt carrier composed of the chains 37 and the cross members $37^x$ will carry the coal rearwardly and dump it into the car 90. Now the gears 29 and the rack 30 serve not only for the purpose of moving the chute backwardly and forwardly, but for causing a ramming action to the shovel so as to force it underneath the coal. The reversal of current through the motor 22 will cause the retraction of the shovel. Fig. 4 shows the device in its extended position and Fig. 3 in its retracted position. Of course, during the operation of the device the chain 70 which furnishes power for the rear wheels 2 of the truck should be disconnected and taken off since the truck itself is designed to be stationary while the member 11 is reciprocating. Now if it is desired to shift the shovel laterally so as to work in a direction at an angle to the track the crank 85 may be turned so as to bring the shovel into the desired position as for instance that shown in Fig. 11. The frame 34 being swiveled on the table 15, will not turn but will remain parallel with the track. It will be noted that the swiveled mounting of the frame 34 is on the line which forms the axis of the pivot member 4 of the turn table. Consequently the chute 16 is always in a position to deliver coal into the hopper 35. Moreover since the apparatus which operates the chains 13 is mounted on the table 15, which, as will be seen from Fig. 13

11, is also shifted the shovel may be reciprocated as well in a direction at an angle to the track 1 as when parallel with it.

When the shovel is being forced forwardly it will be apparent that the rate of travel of the chain 13 relative to the partition 11$^k$ on the upper side of the latter will be greater than when the shovel is at rest. This will cause a greater tension on the chain and in order to ease this tension I provide the yieldable bearings such as that shown at 91 in Fig. 9. These bearings support the axle 92 upon which the sprockets 17 are mounted. The member 11 is provided with a slot 11$^o$ in which the bearing 91 slides (see Fig. 10) springs 93 being disposed on each side of the bearing to take up the extra tension. When the member 11 is at rest the normal position of the bearings 91 is that shown in Fig. 9.

By means of the crank 49 the frame 34 may be raised or lowered so as to accommodate cars of different height and the frame is retained in position by means of a locking dog 94 which engages the gear 48. The mine cars 90 when filled may be run out and empty cars run in underneath the end of the frame 34 in position to receive the coal.

When it is desired to withdraw the apparatus from its position the shovel 18 is swung upwardly by loosening the locking nuts 20 as heretofore explained and tightening them when the shovel is in the dotted line position shown in Fig. 5. In this connection I desire to call attention to the fact that the pivotal connection 19 is at the rear of the joint 18$^k$ which is formed by the movable part of the shovel and the end of the partition 11$^k$. In Fig. 5 the joint is shown closed so as to provide a smooth surface for the travel of the chain 13, but when the shovel is swung upwardly this joint is broken as shown in dotted lines in Fig. 5. The locking dog 94 on the supports 39 of the frame 34 is thrown back and the crank is turned so as to raise the extension 42. The frame 34 will now swing downwardly on its pivot 33 until the bracket 51 rests on the rear end of the table 15. Further movement of the crank will raise the wheels 44 which support the uprights 39 clear of the track. It will now be seen that the frame 34 rests entirely upon the truck. The chain 70 is now placed in position and the clutch lever 78 is thrown out. Now when the motor 61 is energized the whole apparatus will be moved bodily on the wheels 2 along the track 1.

A device built as described above has several advantages over ordinary loading devices. One of the main features is that the chute 11 may not only be thrust forward, but it may be swung at an angle to the track and used as a ram precisely as if it were parallel with the track without interfering with the proper delivery of the coal to the hopper. This does not necessitate the movement of the hopper and its conveying mechanism so that the conveyer which conveys the coal from the hopper into the car maintains a position parallel with the track at all times. The simple device by means of which the outer end of the conveyer 34 may be supported either by means of the track rails 1 or by the truck 3 I also regard as an important feature. The provision of means by which the chain 13 may be constantly running and at the same time may be carried forwardly and rearwardly by means of the reciprocating chute 11 insures the proper working of the device under all conditions.

I am aware that other devices based upon the same general plan might be made but I consider as my own all such modifications as fairly fall within the spirit and the scope of the appended claims.

I claim:

1. In a loader, a truck, a turn table carried thereby, a reciprocating chute carried by said turn table, a shovel pivotally connected with the forward end of said reciprocating chute, an elevating frame, a receptacle supported by said turn table, an endless conveyer, means carried by said reciprocating chute, said shovel and said elevating frame for supporting said endless conveyer, one end of said elevating frame being above said receptacle for delivering material carried by the endless conveyer into said receptacle, means for driving said chain, means for rotating said turn table to bring said chute into angular positions with respect to said truck, and means for preventing the rotation of said receptacle.

2. In a loader, a truck, a turn table carried thereby, a reciprocating chute carried by said turn table, a shovel pivotally connected with the forward end of said reciprocating chute, an elevating frame, a receptacle supported by said turn table, an endless conveyer, means carried by said reciprocating chute, said shovel, and said elevating frame for supporting said endless conveyer, one end of said elevating frame being above said receptacle for delivering material carried by the endless conveyer into said receptacle, means for driving said chain, means for rotating said turn table to bring said chute into angular positions with respect to said truck, means for preventing the rotation of said receptacle, said last named means comprising a pivot for mounting said receptacle upon said turn table, an extension carried by said receptacle, and adjustable supports for said extension.

3. In a loader, a truck, a turn table carried thereby, a reciprocating chute carried by said turn table, a shovel pivotally connected with the forward end of said reciprocating chute, an elevating frame, a receptacle supported by said turn table, an endless conveyer, means carried by said reciprocating chute, said shovel, and said elevating frame for supporting said endless conveyer, one end of said elevating frame being above said receptacle for delivering material carried by the endless conveyer into said receptacle, means for driving said chain, means for rotating said turn table to bring said chute into angular positions with respect to said truck, means for preventing the rotation of said receptacle, said last named means comprising a pivot for mounting said receptacle upon said turn table, an extension carried by said receptacle, adjustable supports for said extension, and an endless conveyer carried by said extension and arranged to extend into said receptacle for conveying away the material deposited in the receptacle.

4. In a loader, a truck, a turn table carried thereby, a reciprocating chute carried by said turn table, a shovel pivotally connected with the forward end of said reciprocating chute, an elevating frame, a receptacle supported by said turn table, an endless conveyer, means carried by said reciprocating chute, said shovel, and said elevating frame for supporting said endless conveyer, one end of said elevating frame being above said receptacle for delivering material carried by the endless conveyer into said receptacle, means for driving said chain, means for rotating said turn table to bring said chute into angular positions with respect to said truck, means for preventing the rotation of said receptacle, said last named means comprising a pivot for mounting said receptacle upon said turn table, an extension carried by said receptacle, adjustable supports for said extension, an endless conveyer carried by said extension and arranged to extend into said receptacle for conveying away the material deposited in the receptacle, and a bracket carried by said adjustable supports and arranged to rest on said turn table in certain of the adjusted positions of said support.

5. In a loader, a truck, a turn table carried thereby, a reciprocating chute carried by said turn table, a shovel pivotally connected with the forward end of said reciprocating chute, an elevating frame, a receptacle supported by said turn table an endless conveyer, means carried by said reciprocating chute, said shovel, and said elevating frame for supporting said endless conveyer, one end of said elevating frame being above said receptacle for delivering material carried by the endless conveyer into said receptacle, means for driving said chain, means for rotating said turn table to bring said chute into angular positions with respect to said truck, means for preventing the rotation of said receptacle, said last named means comprising a pivot for mounting said receptacle upon said turn table, an extension carried by said receptacle, adjustable supports for said extension, an endless conveyer carried by said extension and arranged to extend into said receptacle for conveying away the material deposited in the receptacle, and a bracket carried by said adjustable supports and arranged to rest on said turn table in certain of the adjusted positions of said support, the end of said extension projecting beyond said adjustable supports and being elevated from the track, and the conveyer in said extension being arranged to eject material from the end of said extended portion.

6. In a loader, a truck, a turn table carried by said truck, a reciprocating chute carried by said turn table, a receptacle swiveled on said turn table, a frame constituting an extension of said receptacle, supports for said frame, a shovel carried by said reciprocating chute, and means comprising an endless conveyer for elevating the material engaged by the shovel into the receptacle.

7. In a loader, a truck, a turn table carried by said truck, a reciprocating chute carried by said turn table, a receptacle swiveled on said turn table, a frame constituting an extension of said receptacle, supports for said frame, a shovel carried by said reciprocating chute, means comprising an endless conveyer for elevating the material engaged by the shovel into the receptacle, and means comprising an endless conveyer disposed in said receptacle and said extension for discharging the material deposited in said receptacle at the end of said extension frame.

8. In a loader, a truck, a reciprocating chute rotatably carried thereby, means for rotating said chute with respect to said truck, a shovel carried by the forward end of said chute, a receptacle swiveled upon said truck and having an extension, means for reciprocating said chute, and means for depositing the material entering the shovel into said receptacle in any position of the shovel.

WILLIAM WIBLE JAMISON.

Witnesses:
CLYDE E. COWAN,
JOHN D. BOTT.